(12) United States Patent
Lu

(10) Patent No.: US 6,981,009 B2
(45) Date of Patent: Dec. 27, 2005

(54) APPARATUS AND METHOD FOR COMPUTING A LOGARITHM OF A FLOATING-POINT NUMBER

(75) Inventor: Chung-Yen Lu, Taipei (TW)

(73) Assignee: Silicon Integrated Systems Corp., (TW)

( * ) Notice: Subject to any disclaimer, the term of this patent is extended or adjusted under 35 U.S.C. 154(b) by 511 days.

(21) Appl. No.: 10/191,214

(22) Filed: Jul. 9, 2002

(65) Prior Publication Data

US 2004/0010532 A1 Jan. 15, 2004

(51) Int. Cl.$^7$ ................................. G06F 5/00
(52) U.S. Cl. ....................................... 708/204
(58) Field of Search ................. 708/204, 517, 708/495

(56) References Cited

U.S. PATENT DOCUMENTS

| | | | | |
|---|---|---|---|---|
| 5,365,465 A | * | 11/1994 | Larson ........................ | 708/204 |
| 5,619,198 A | * | 4/1997 | Blackham et al. ............ | 341/50 |
| 5,831,878 A | * | 11/1998 | Ishida ........................ | 708/277 |
| 6,049,343 A | * | 4/2000 | Abe et al. ................... | 345/501 |
| 6,144,977 A | * | 11/2000 | Giangarra et al. .......... | 708/204 |
| 6,529,922 B1 | * | 3/2003 | Hoge ........................ | 708/204 |

\* cited by examiner

*Primary Examiner*—D. H. Malzahn
(74) *Attorney, Agent, or Firm*—Merchant & Gould P.C.

(57) ABSTRACT

An apparatus for computing a logarithm to a base p of a floating-point number X. The floating-point number X is represented in the format of $(-1)^{S_x} \cdot 2^{E_x} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N–K) bits of $f_x$, $0 \leq K < N$, and p, K, N are natural numbers. The apparatus includes: a first multiplier, a logarithmic table, a first adder, a divider, a Taylor-Series approximation circuit, a second multiplier, and a second adder.

12 Claims, 5 Drawing Sheets

APPARATUS AND METHOD FOR COMPUTING A LOGARITHM OF A FLOATING-POINT NUMBER

BACKGROUND OF THE INVENTION

1. Field of the Invention

The present invention relates in general to an apparatus and a method to perform logarithmic computations, and more particularly to the precise computation of a logarithm to a base p of a floating-point number.

2. Description of the Related Art

The representation of floating-point numbers is similar to commonly used scientific notation and consists of two parts, the mantissa M and the exponent. The floating-point number F represented by the pair (M, E) has the value, $$F = M \times \beta^E$$

Where $\beta$ is the base of the exponent.

In an effort to unify methods employed in computer systems for performing binary floating-point arithmetic, the IEEE in the early 1980s standardized computer floating-point numbers. Such binary floating-point numbers make possible the manipulation of large as well as small numbers with great precision, and thus are often used in scientific calculations. They typically comprise either single precision format or double precision format, with single precision operating on 32-bit operands and double precision operating on 64-bit operands. Both single and double precision numbers constitute a bit-string characterized by three fields: a single sign bit, several exponent bits, and several fraction or mantissa bits, with the sign bit being the most significant bit, the exponent bits being the next most significant, and the mantissa bits being the least significant.

FIG. 1 is a diagram showing the form of the single format. Hence, base 2 was selected, a flowing point number F in the single format has the form:

$$F = (-1)^S \cdot 2^{E-127} \cdot (1.f)$$

where S=sign bit;

E=8-bit exponent biased by 127;

f=F's 23-bit fraction or mantissa which, together an implicit leading 1, yield the significant digit field "1. - - - ".

Presently, the calculation for the floating-point is used for all kinds of calculations. Computing efficiency depends on efficiency of the calculation of the floating-point. For logarithmic computation of a floating-point number, a logarithmic table is usually determined in advance. Then, the result is found by checking the table. However, when using the logarithmic table, there is a problem of precision. An 8-bit logarithmic table is quite large, but if an 8-bit logarithmic table is used for logarithmic computation of a flouting-point number, the precision of the computing result is not enough. Because the mantissa part of the flouting-point number has 23 bits, to precisely compute a logarithmic of a floating-point number, it is not enough to check an 8-bit logarithmic table.

SUMMARY OF THE INVENTION

In view of the above, an object of the present invention is to provide an apparatus and a method for precisely computing a logarithm to a base p of a floating-point number.

For the purpose of the present invention, the invention provides an apparatus for computing a logarithm to a base p of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and p, K, N are natural numbers. The apparatus comprises: a first multiplier for multiplying a number whose value is $\log_p 2$ and the exponent $E_x$ and outputting a multiplying result; a logarithmic table for receiving the value $A_x$ and checking the logarithmic table to output a result; a first adder connected to the first multiplier and the logarithmic table for adding the multiplying result and the result to output an adding result; a divider for receiving the value $B_x$ and an adding number whose value is $(2^K + A_x)$ and dividing the value $B_x$ by the adding number to output a dividing result $R_d$; a Taylor-Series approximation circuit connected to the divider for receiving the dividing result $R_d$, finding a value of $\ln(1+R_d)$ and outputting the value of $\ln(1+R_d)$; a second multiplier for multiplying a number whose value is $1/\ln(p)$ and the value of $\ln(1+R_d)$ to output a second multiplying result; and a second adder connected to the first adder and the second multiplier for adding the adding result and the second multiplying result to output the logarithm Y.

Furthermore, the invention provides a method for computing a logarithm to a base p of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and p, K, N are natural numbers. The method comprises the steps of: multiplying a number whose value is $\log_p 2$ and the exponent $E_x$ to get a multiplying result to output by a first multiplier; receiving the value $A_x$ by a logarithmic table and checking the logarithmic table to get a result to output; adding the multiplying result and the result to get an adding result to output by a first adder; dividing the value $B_x$ by an adding number whose value is $(2^K + A_x)$ to get a dividing result $R_d$ to output by a divider; receiving the dividing result $R_d$ and finding a value of $\ln(1+R_d)$ to output by a Taylor-Series approximation circuit; multiplying a number whose value is $1/\ln(p)$ and the exponent $E_x$ to get a second multiplying result to output by a second multiplier; adding the adding result and the second multiplying result to get the logarithm Y to output by a second adder.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
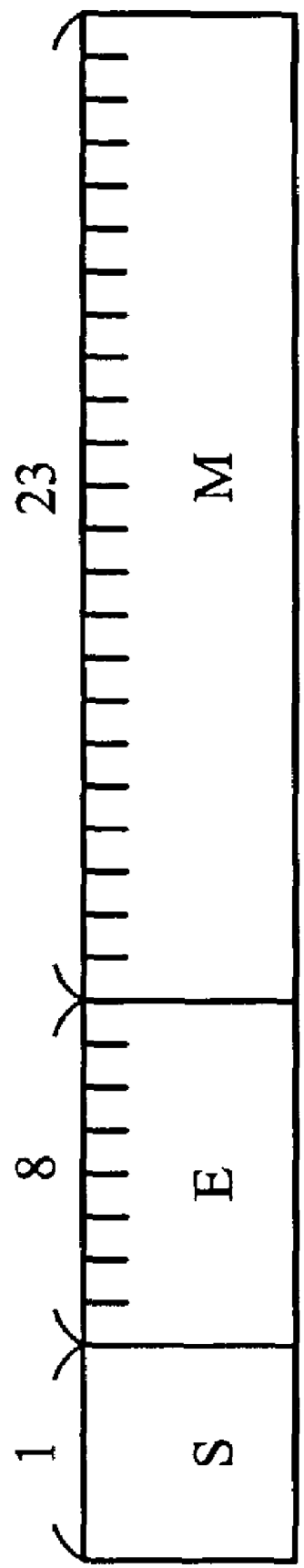
FIG. 1 is a diagram showing the form of the single format.
Figure 2:
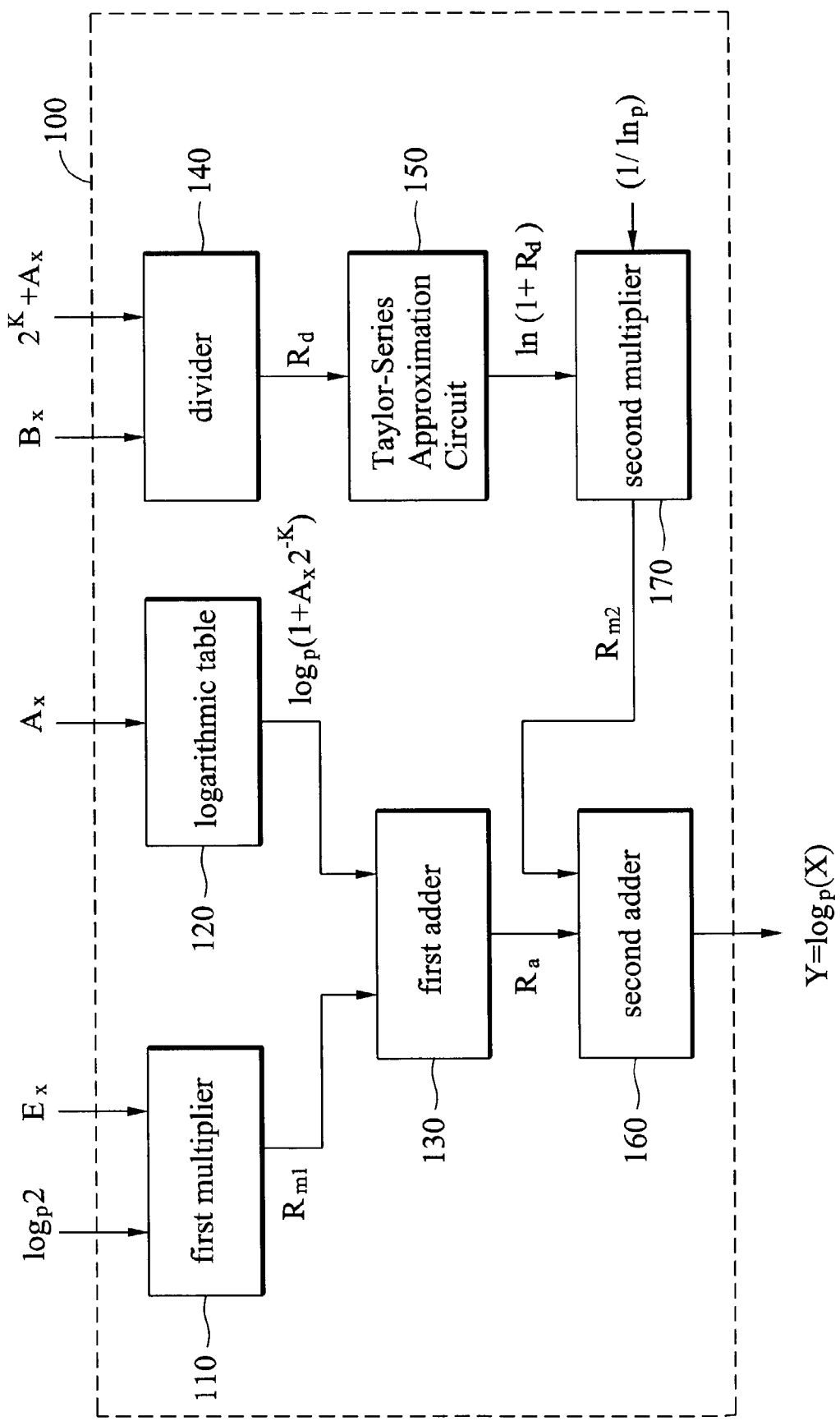
FIG. 2 is a schematic diagram showing the apparatus for computing a logarithm of a floating-point number according to the present invention.

FIG. 2 is a schematic diagram showing the apparatus for computing a logarithm of a floating-point number according to the present invention. The apparatus 100, as shown in FIG. 2, comprises a first multiplier 110, a logarithmic table 120, a first adder 130, a divider 140, a Taylor-Series Approximation Circuit 150, a second adder 160 and a second multiplier 170.

The apparatus 100 is used to compute a logarithm Y to a base p of a floating-point number X wherein the floating-point number X is represented in the format of $(-1)^{S_x} \cdot 2^{E_x} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and K,N are natural numbers. The first multiplier 110 receives a number whose value is $\log_p 2$ and the exponent $E_x$ and outputs a multiplying result $R_{m1}$. The logarithmic table 120 receives the value $A_x$ and checking the logarithmic table 120 to output a result of $\log_p(1+A_x \cdot 2^{-K})$. The first adder 130 is connected to the first multiplier 110 and the logarithmic table 120 for adding the multiplying result $R_{m1}$ and the result of $\log_p(1+A_x \cdot 2^{-K})$ to output an adding result $R_a$. The divider 140 receives the value $B_x$ and an adding number whose value is $(2^K + A_x)$, and divides the value $B_x$ by the adding number to output a dividing result $R_d$. The Taylor-Series approximation circuit 150 is connected to the divider 140 for receiving the dividing result $R_d$, finding a value of $\ln(1+R_d)$ and outputting the value of $\ln(1+R_d)$. The second multiplier 170 receives a number whose value is $1/\ln(P)$ and the value of $\ln(1+R_d)$ to output a second multiplying result $R_{m2}$. The second adder 160 connected to the first adder 150 and the second multiplier 170 for adding the adding result $R_a$ and the second multiplying result $R_{m2}$ to output the logarithm Y.

The floating-point number X is represented in the following format:

$$X = (-1)^{S_x} \cdot 2^{E_x} \cdot M_x \quad (1)$$

where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (M−K) bits of $f_x$, $0 \leq K < N$, and K, N are natural numbers.

The present invention is used to compute the logarithm Y. The logarithm Y is given by:

$$\begin{aligned}
Y &= \log_p X \quad (2) \\
&= \log_p \lfloor ((1+A_x \cdot 2^{-K} + B_x \cdot 2^{-N})) \cdot 2^{E_x} \rfloor \\
&= \log_p(2^{E_x}) + \log_p\left[(1+A_x \cdot 2^{-K}) \cdot \left(\frac{1+A_x \cdot 2^{-K} + B_x \cdot 2^{-N}}{1+A_x \cdot 2^{-K}}\right)\right] \\
&= E_x \cdot \log_p(2) + \log_p(1+A_x \cdot 2^{-K}) + \log_p\left(1 + \frac{B_x \cdot 2^{-N}}{1+A_x \cdot 2^{-K}}\right) \\
&= E_x \cdot \log_p(2) + \log_p(1+A_x \cdot 2^{-K}) + \frac{\ln(1+R_d)}{\ln(p)} \quad \text{where}
\end{aligned}$$

$$R_d = \frac{B_x \cdot 2^{-N}}{1+A_x \cdot 2^{-K}}$$

Therefore, to find the logarithm Y, the number whose value is $\log_p 2$ and the exponent $E_x$ are input to the first multiplier 110 to get the multiplying result $R_{m1}$ to output at first. The value $A_x$ is input to the logarithmic table 120 and checks the logarithmic table 120 to get the result of $\log_p(1+A_x \cdot 2^{-K})$ to output. Then, the multiplying result $R^{m1}$ and the result of $\log_p(1+A_x \cdot 2^{-K})$ are added by the first adder 130 to get the adding result $R_a$. As well, the value $B_x$ is divided by the adding number whose value is $(2^K + A_x)$ in the divider 140 to get the dividing result $R_d$ to output. Then, the dividing result $R_d$ is input to the Taylor-Series approximation circuit 150 to find the value of $\ln(1+R_d)$ to output. The number whose value is $1/\ln(p)$ and the value of $\ln(1+R_d)$ are input to the second multiplier 170 to get the second multiplying result $R_{m2}$ to output. Finally, the adding result $R_a$ and the second multiplying result $R_{m2}$ are input to the second adder 160 to get the logarithm Y to output.

When computing a logarithm to a base 2 of the floating-point number X, the first multiplier 110 receives a number whose value is $\log_2 2(=1)$ and the exponent $E_x$. Therefore, the first multiplier 110 is not required. When computing a natural logarithm of the floating-point number X, the second multiplier 170 receives a number whose value is $1/\ln(e)(=1)$ and the value of $\ln(1+R_d)$. Therefore, the second multiplier 170 is not required.

Figure 3:
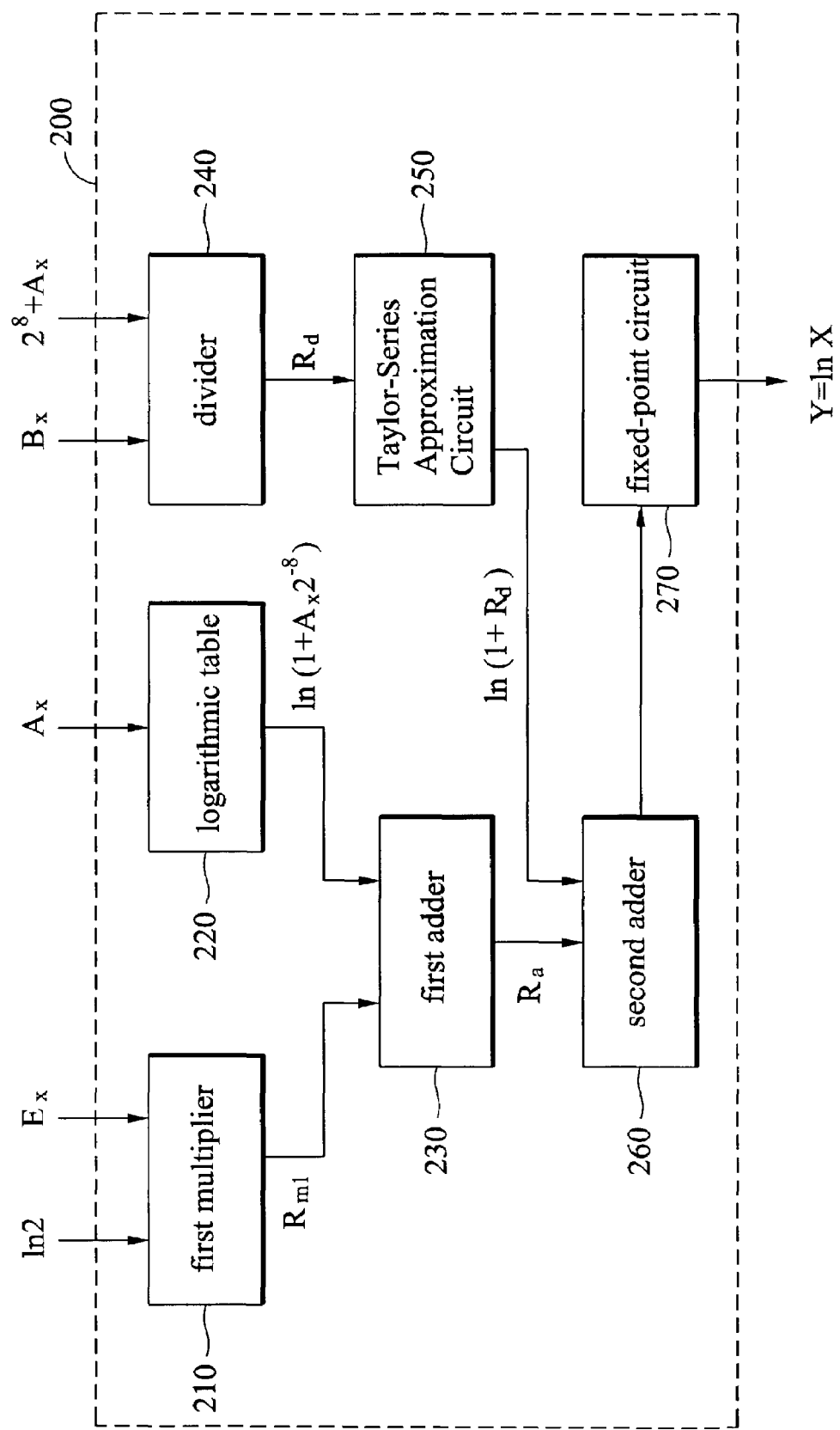
FIG. 3 is a schematic diagram showing the apparatus for computing a logarithm of a floating-point number according to the first embodiment of the present invention.

FIG. 3 is a schematic diagram showing the apparatus for computing a logarithm of a floating-point number according to the present invention. The apparatus 200, as shown in FIG. 3, comprises a multiplier 220, a logarithmic table 220, a first adder 230, a divider 240, a Taylor-Series Approximation Circuit 250, a second adder 260 and a fixed-point circuit 270.

The apparatus 200 is used for a natural logarithm computation of a floating-point number X. The floating-point number X is an IEEE single precision floating point number, with thirty-two bits: $X_{31}, X_{30}, \ldots,$ and $X_0$. Because the floating-point number X is greater than zero, the sign bit of the floating-point number $S_x$ (bit $X_{31}$) must be zero. Therefore, the floating-point number X is represented in the format of $2^{E_x} \cdot M_x$. The exponent of the floating-point number $E_x$ has eight bits: $X_{30}, X_{29}, \ldots,$ and $X_{23}$. The mantissa of the floating-point number $M_x$ is represented in the format $(1+f_x)$. The fraction of the floating-point number $f_x$ has twenty-three bits: $X_{22}, X_{21}, \ldots,$ and $X_0$. The fraction of the floating-point number $f_x$ are divided into two parts: $A_x$ and $B_x$. $A_x$ is a value of the most significant 8 bits of $f_x$. $B_x$ is a value of the least significant 15 bits of $f_x$. It means that $A_x$ is the value of $X_{22} \sim X_{15}$ and $B_x$ is the value of $X_{14} \sim X_{10}$.

The multiplier 210 receives a number whose value is ln2 and the exponent $E_x$ and outputs a multiplying result $R_{m1}$. The logarithmic table 220 receives the value $A_x$ and checking the logarithmic table 220 to output a result of $\ln(1+A_x \cdot 2^{-8})$. The first adder 230 is connected to the multiplier 210 and the logarithmic table 220 for adding the multiplying result $R_{m1}$ and the result of $\ln(1+A_x \cdot 2^{-8})$ to output an adding result $R_a$. The divider 240 receives the value $B_x$ and an adding number whose value is $(2^8 + A_x)$ and divides the value $B_x$ by the adding number to output a dividing result $R_d$. The Taylor-Series approximation circuit 250 is connected to the divider 240 for receiving the dividing result $R_d$, finding a value of $\ln(1+R_d)$ and outputting the value of $\ln(1+R_d)$. The second adder 260 is connected to the first adder 230 and the Taylor-Series approximation circuit 250 for adding the adding result $R_a$ and the value of $\ln(1+R_d)$ to output a computed result Y. In this embodiment of the present invention, the apparatus comprises the fixed-point circuit 270. The fixed-point circuit 270 is received the computed result Y and representing the computed result Y in the format of $(-1)^{S_y} \cdot 2^{E_y} \cdot M_y$, where $S_y$ is a sign, $E_y$ is an exponent, $M_y$ is a mantissa, $1 \leq M_y < 2$.

The embodiment of the present invention is used to compute the logarithm Y. The logarithm Y is given by:

$$\begin{aligned} Y &= \ln(X) \\ &= \ln\lfloor((1 + A_x \cdot 2^{-8} + B_x \cdot 2^{-23})) \cdot 2^{E_x}\rfloor \\ &= \ln(2^{E_x}) + \ln\left[(1 + A_x \cdot 2^{-8}) \cdot \left(\frac{1 + A_x \cdot 2^{-8} + B_x \cdot 2^{-23}}{1 + A_x \cdot 2^{-8}}\right)\right] \\ &= E_x \cdot \ln(2) + \ln(1 + A_x \cdot 2^{-8}) + \ln\left(1 + \frac{B_x \cdot 2^{-23}}{1 + A_x \cdot 2^{-8}}\right) \\ &= E_x \cdot \ln(2) + \ln(1 + A_x \cdot 2^{-8}) + \ln(1 + R_d) \quad \text{where} \end{aligned} \tag{3}$$

$$R_d = \frac{B_x \cdot 2^{-23}}{1 + A_x \cdot 2^{-8}}$$

Therefore, to find the logarithm Y, a number whose value is ln2 and the exponent $E_x$ are input to the multiplier 210 to get the multiplying result $R_{m1}$ to output at first. The value $A_x$ is input to the logarithmic table 220 and check the logarithmic table 220 to get the result of $\ln(1+A_x \cdot 2^{-8})$ to output. Then, the multiplying result $R_{m1}$ and the result of $\ln(1+A_x \cdot 2^{-8})$ are added by the first adder 230 to get the adding result $R_a$. As well, the value $B_x$ is divided by the adding number whose value is $(2^8+A_x)$ in the divider 240 to get the dividing result $R_d$ to output. Then, the dividing result $R_d$ is input to the Taylor-Series approximation circuit 250 to find the value of $\ln(1+R_d)$ to output (referring FIG. 4). Finally, the adding result $R_a$ and the value of $\ln(1+R_d)$ are input to the second adder 260 to get the logarithm Y to output.

Figure 4:
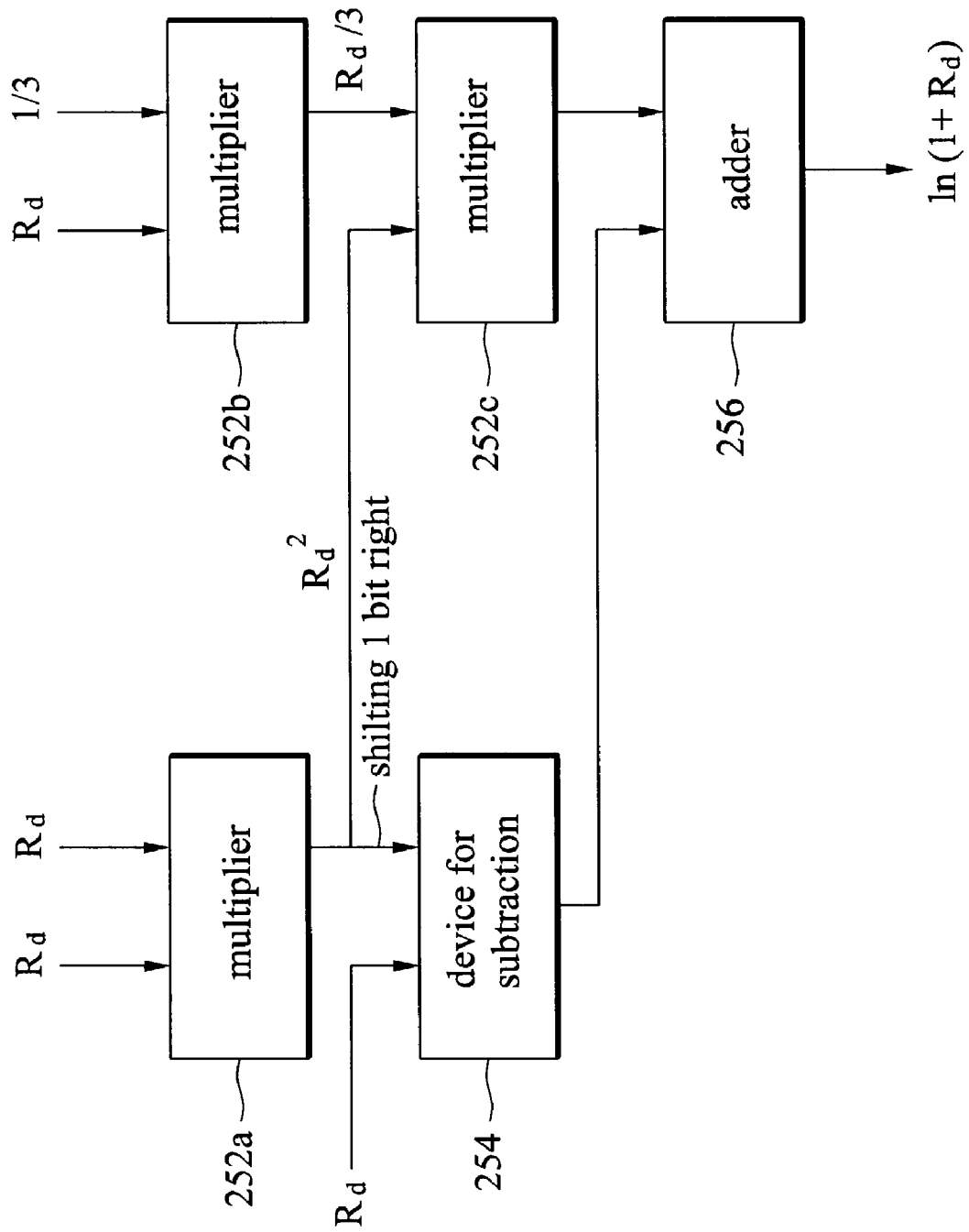
FIG. 4 is a schematic diagram showing one example of the apparatus for computing a Taylor-Series approximation circuit according to the first embodiment of FIG. 3.
Figure 5:
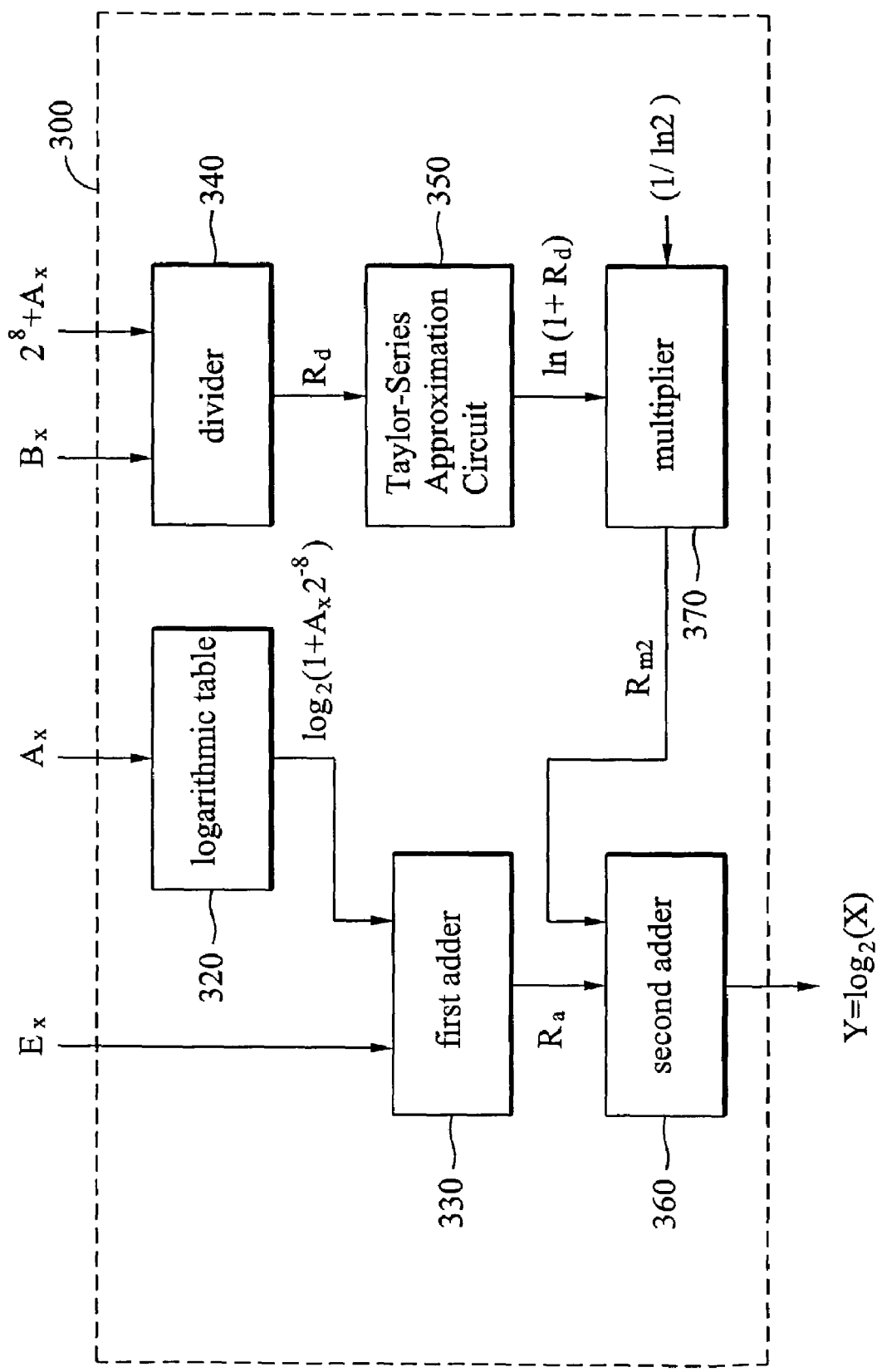
FIG. 5 is a schematic diagram showing the apparatus for computing a logarithm of a floating-point number according to the second embodiment of the present invention.

FIG. 4 is a schematic diagram showing one example of the apparatus for computing a Taylor-Series approximation circuit according to FIG. 3. The Taylor-Series approximation circuit 250 is a predetermined circuit to find the value of $\ln(1+R_d)$ with three-term approximation. As shown in FIG. 5, the Taylor-Series approximation circuit 250 comprises three multiplier 252a~252c, a device for subtraction 254 and a adder 256.

The value of $\ln(1+R_d)$ is approximated as:

$$\ln(1+R_d) \approx R_d - \frac{R_d^2}{2} + \frac{R_d^3}{3} \tag{4}$$

Two of the dividing results $R_d$ are input to the multiplier 252a. The multiplier 252a outputs a value of $R_d^2$. Then, the value of $R_d^2$ is shifted 1-bit right to obtain a value of $R_d^2/2$. One dividing result $R_d$ and the value of $R_d^2/2$ are input into the device for subtraction 254. As well, one dividing result $R_d$ and a number whose value is ⅓ are input to the multiplier 252b. The multiplier 252b outputs a value of $R_d/3$. The value of $R_d/3$ and the value of $R_d^2$ are input to the multiplier 252c. The multiplier 252c outputs a value of $R_d^3/3$. The adder 256 is connected to the subtraction 254 and the device for subtraction 254 to output the value of $\ln(1+R_d)$.

FIG. 5 is a schematic diagram showing the apparatus for computing a logarithm of a floating-point number according to another embodiment of the present invention. The apparatus 300, as shown in FIG. 5, comprises a logarithmic table 320, a first adder 330, a divider 340, a Taylor-Series Approximation Circuit 350, a second adder 360 and a multiplier 370.

The apparatus 300 is used to compute logarithm base-2 of a floating-point number X. The floating-point number X is an IEEE single precision floating point number, with thirty-two bits: $X_{31}, X_{30}, \ldots,$ and $X_0$. Because the floating-point number X is greater than zero, the sign bit of the floating-point number $S_x$ (bit $X_{31}$) must be zero. Therefore, the floating-point number X is represented in the format of $2^{E_x} \cdot M_x$. The exponent of the floating-point number $E_x$ has eight bits: $X_{30}, X_{29}, \ldots,$ and $X_{23}$. The mantissa of the floating-point number $M_x$ is represented in the format $(1+f_x)$. The fraction of the floating-point number $f_x$ has twenty-three bits: $X_{22}, X_{21}, \ldots,$ and $X_0$. The fraction of the floating-point number $f_x$ are divided into two parts: $A_x$ and $B_x$. $A_x$ is a value of the most significant 8 bits of $f_x$. $B_x$ is a value of the least significant 15 bits of $f_x$. It means that $A_x$ is the value of $X_{22} \sim X_{15}$ and $B_x$ is the value of $X_{14} \sim X_{10}$.

The logarithmic table 320 receives the value $A_x$ and checking the logarithmic table 320 to output a result of $\log_2(1+A_x \cdot 2^{-8})$ The first adder 330 receives the exponent $E_x$ and the result of $\log_2(1+A_x \cdot 2^{-8})$ to output an adding result $R_a$. The divider 340 receives the value $B_x$ and an adding number whose value is $(2^8+A_x)$ and divides the value $B_x$ by the adding number to output a dividing result $R_d$. The Taylor-Series approximation circuit 350 is connected to the divider 340 for receiving the dividing result $R_d$, finding a value of $\ln(1+R_d)$ and outputting the value of $\ln(1+R_d)$. The multiplier 370 receives a number whose value is $1/\ln(2)$ and the value of $\ln(1+R_d)$ to output a second multiplying result $R_{m2}$. The second adder 360 connected to the first adder 350 and the multiplier 370 for adding the adding result $R_a$ and the second multiplying result $R_{m2}$ to output the logarithm Y.

The embodiment is used to compute logarithm base-2 of the floating-point number X. The computed result Y is given by:

$$\begin{aligned} Y &= \log_2(X) \\ &= \log_2\lfloor((1 + A_x \cdot 2^{-8} + B_x \cdot 2^{-23})) \cdot 2^{E_x}\rfloor \\ &= \log_2(2^{E_x}) + \log_2\left[(1 + A_x \cdot 2^{-8}) \cdot \left(\frac{1 + A_x \cdot 2^{-8} + B_x \cdot 2^{-23}}{1 + A_x \cdot 2^{-8}}\right)\right] \\ &= E_x \cdot \log_2(2) + \log_2(1 + A_x \cdot 2^{-8}) + \log_2\left(1 + \frac{B_x \cdot 2^{-23}}{1 + A_x \cdot 2^{-8}}\right) \\ &= E_x + \log_2(1 + A_x \cdot 2^{-8}) + \frac{\ln(1 + R_d)}{\ln(2)} \quad \text{where} \end{aligned} \tag{4}$$

$$R_d = \frac{B_x \cdot 2^{-23}}{1 + A_x \cdot 2^{-8}}$$

Therefore, to find the logarithm Y, the value $A_x$ is input to the logarithmic table 320 and checks the logarithmic table 320 to get the result of $\ln(1+A_x \cdot 2^{-8})$ to output. Then, the exponent $E_x$ and the result of $\ln(1+A_x \cdot 2^{-8})$ are added by the first adder 330 to get the adding result $R_a$. As well, the value $B_x$ is divided by the adding number whose value is $(2^8+A_x)$ in the divider 340 to get the dividing result $R_d$ to output. Then, the dividing result $R_d$ is input to the Taylor-Series approximation circuit 350 to find the value of $\ln(1+R_d)$ to output. A number whose value is $1/\ln(2)$ and the value of $\ln(1+R_d)$ are input to the multiplier 370 to get a second multiplying result $R_{m2}$ output. Finally, the adding result $R_a$ and the second multiplying result $R_{m2}$ are input to the second adder 360 to get the logarithm Y to output.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for computing a logarithm to a base p of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and p, K, N are natural numbers, the apparatus comprising:

a first multiplier for multiplying a number whose value is $\log_p 2$ and the exponent $E_x$ and outputting a multiplying result;

a logarithmic table for receiving the value $A_x$ and checking the logarithmic table to output a result;

a first adder connected to the first multiplier and the logarithmic table for adding the multiplying result and the result to output an adding result;

a divider for receiving the value $B_x$ and an adding number whose value is $(2^K + A_x)$ and dividing the value $B_x$ by the adding number to output a dividing result $R_d$;

a Taylor-Series approximation circuit connected to the divider for receiving the dividing result $R_d$, finding a value of $\ln(1+R_d)$ and outputting the value of $\ln(1+R_d)$;

a second multiplier for multiplying a number whose value is $1/\ln(p)$ and the value of $\ln(1+R_d)$ to output a second multiplying result; and a second adder connected to the first adder and the second multiplier for adding the adding result and the second multiplying result to output the logarithm Y.

2. The apparatus as claimed in claim 1 further comprising a fixed-point circuit for receiving the logarithm Y and representing the logarithm Y in the format of $(-1)^{Sy} \cdot 2^{Ey} \cdot M_y$, where $S_y$ is a sign, $E_y$ is an exponent, $M_y$ is a mantissa, $1 \leq M_y < 2$.

3. The apparatus as claimed in claim 2, wherein the Taylor-Series approximation circuit is a predetermined circuit to find the value of $\ln(1+R_d)$ with three-term approximation.

4. The apparatus as claimed in claim 1, wherein the logarithmic table is a predetermined logarithmic table for computing the logarithm of the value $A_x \cdot 2^{-K}$ to the base p.

5. The apparatus as claimed in claim 1, wherein the Taylor-Series approximation circuit is a predetermined circuit to find the value of $\ln(1+R_d)$ with three-term approximation.

6. A method for computing a logarithm to a base p of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, Bx is a value of the least significant (N−K) bits of $f_x$, $0 \leq K < N$, and p, K, N are natural numbers, the method comprising the steps of:

multiplying a number whose value is $\log_p 2$ and the exponent $E_x$ to get a multiplying result to output by a first multiplier;

receiving the value $A_x$ by a logarithmic table and checking the logarithm table to get a result to output;

adding the multiplying result and the result to get an adding result to output by a first adder;

dividing the value $B_x$ by an adding number whose value is $(2^K + A_x)$ to get a dividing result $R_d$ to output by a divider;

receiving the dividing result $R_d$ and finding a value of $\ln(1+R_d)$ to output by a Taylor-Series approximation circuit;

multiplying a number whose value is $1/\ln(p)$ and the value of $\ln(1+R_d)$ to get a second multiplying result to output by a second multiplier; and adding the adding result and the second multiplying result to get the logarithm Y to output by a second adder.

7. The method as claimed in claim 6 further comprising a fixed-point circuit for receiving the logarithm Y and representing the logarithm Y in the format of $(-1)^{Sy} \cdot 2^{Ey} \cdot M_y$, where $S_x$ is a sign, $E_x$ is an exponent, $M_x$ is a mantissa, $1 \leq M_x < 2$.

8. The method as claimed in claim 6, wherein the logarithmic table is a predetermined logarithmic table for computing the logarithm of the value $A_x \cdot 2^{-K}$ to the base p.

9. An apparatus for computing a logarithm to a base 2 of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and p, K, N are natural numbers, the apparatus comprising:

a logarithmic table for receiving the value $A_x$ and checking the logarithmic table to output a result;

a divider for receiving the value $B_x$ and an adding number whose value is $(2^K + A_x)$ and dividing the value $B_x$ by the adding number to output a dividing result $R_d$;

a Taylor-Series approximation circuit connected to the divider for receiving the dividing result $R_d$, finding a value of $\ln(1+R_d)$ and outputting the value of $\ln(1+R_d)$;

a multiplier for multiplying a number whose value is $1/\ln(p)$ and the value of $\ln(1+R_d)$ to output a multiplying result; and an adder connected to the multiplier for adding the result and the multiplying result to output the logarithm Y.

10. An apparatus for computing a natural logarithm of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and p, K, N are natural numbers, the apparatus comprising:

a multiplier for multiplying a number whose value is $\log_p 2$ and the exponent $E_x$ and outputting a multiplying result;

a logarithmic table for receiving the value $A_x$ and checking the logarithmic table to output a result;

an adder connected to the multiplier and the logarithmic table for adding the multiplying result and the result to output an adding result;

a divider for receiving the value $B_x$ and an adding number whose value is $(2^K + A_x)$ and dividing the value $B_x$ by the adding number to output a dividing result $R_d$; and a Taylor-Series approximation circuit connected to the divider for receiving the dividing result $R_d$, finding a value of $\ln(1+R_d)$ and outputting the value of $\ln(1+R_d)$.

11. A method for computing a logarithm to a base 2 of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and p, K, N are natural numbers, the method comprising the steps of:

receiving the value $A_x$ by a logarithmic table and checking the logarithmic table to get a result to output;

dividing the value $B_x$ by an adding number whose value is $(2^K + A_x)$ to get a dividing result $R_d$ to output by a divider;

receiving the dividing result $R_d$ and finding a value of $\ln(1R_d)$ to output by a Taylor-Series approximation circuit;

multiplying a number whose value is $1/\ln(p)$ and the value of $\ln(1+R_d)$ to get a multiplying result to output by a second multiplier; and adding the result and the multiplying result to get the logarithm Y to output by an adder.

12. A method for computing a natural logarithm of a floating-point number X wherein the floating-point number X is represented in the format of $(-1)^{Sx} \cdot 2^{Ex} \cdot M_x$, where $M_x = (1+f_x) = (1+A_x \cdot 2^{-K}) + (B_x \cdot 2^{-N})$, where $S_x$ is a sign, $E_x$ is an exponent, $M_x$ is a mantissa, $1 \leq M_x < 2$, $f_x$ is a N-bit fraction, $A_x$ is a value of the most significant K bits of $f_x$, $B_x$ is a value of the least significant (N−K) bits of $f_x$, $0 \leq K < N$, and p, K, N are natural numbers, the method comprising the steps of:

multiplying a number whose value is $\log_p 2$ and the exponent $E_x$ to get a multiplying result to output by a first multiplier;

receiving the value $A_x$ by a logarithmic table and checking the logarithmic table to get a result to output;

adding the multiplying result and the result to get an adding result to output by a first adder;

dividing the value $B_x$ by an adding number whose value is $(2^K + A_x)$ to get a dividing result $R_d$ to output by a divider; and receiving the dividing result $R_d$ and finding a value of $\ln(1+R_d)$ to output by a Taylor-Series approximation circuit.

* * * * *